No. 825,519. PATENTED JULY 10, 1906.
G. S. CROUSE.
RAKE CONSTRUCTION FOR McDOUGALL FURNACES.
APPLICATION FILED JAN. 24, 1906.

2 SHEETS—SHEET 1.

No. 825,519. PATENTED JULY 10, 1906.
G. S. CROUSE.
RAKE CONSTRUCTION FOR McDOUGALL FURNACES.
APPLICATION FILED JAN. 24, 1906.

2 SHEETS—SHEET 2.

WITNESSES
E. J. Nottingham
G. F. Downing

INVENTOR
G. S. Crouse
By H. A. Seymour
Attorney

UNITED STATES PATENT OFFICE.

GEORGE S. CROUSE, OF GREAT FALLS, MONTANA.

RAKE CONSTRUCTION FOR McDOUGALL FURNACES.

No. 825,519.    Specification of Letters Patent.    Patented July 10, 1906.

Application filed January 24, 1906. Serial No. 297,711.

*To all whom it may concern:*

Be it known that I, GEORGE S. CROUSE, a resident of Great Falls, in the county of Cascade and State of Montana, have invented certain new and useful Improvements in Rake Construction for McDougall Furnaces; and I do hereby declare the following to be a full, clear, and exact description of the invention, such as will enable others skilled in the art to which it appertains to make and use the same.

My invention relates to improvements in rake construction for McDougall furnaces, the object of the invention being to provide improved means for attaching the rakes or blades to the arms, which consists of improved split boxes or frames held together on the arms by the rakes or blades; and the invention consists in certain novel features of construction and combinations and arrangements of parts, as will be more fully hereinafter described, and pointed out in the claims.

Figure 1:
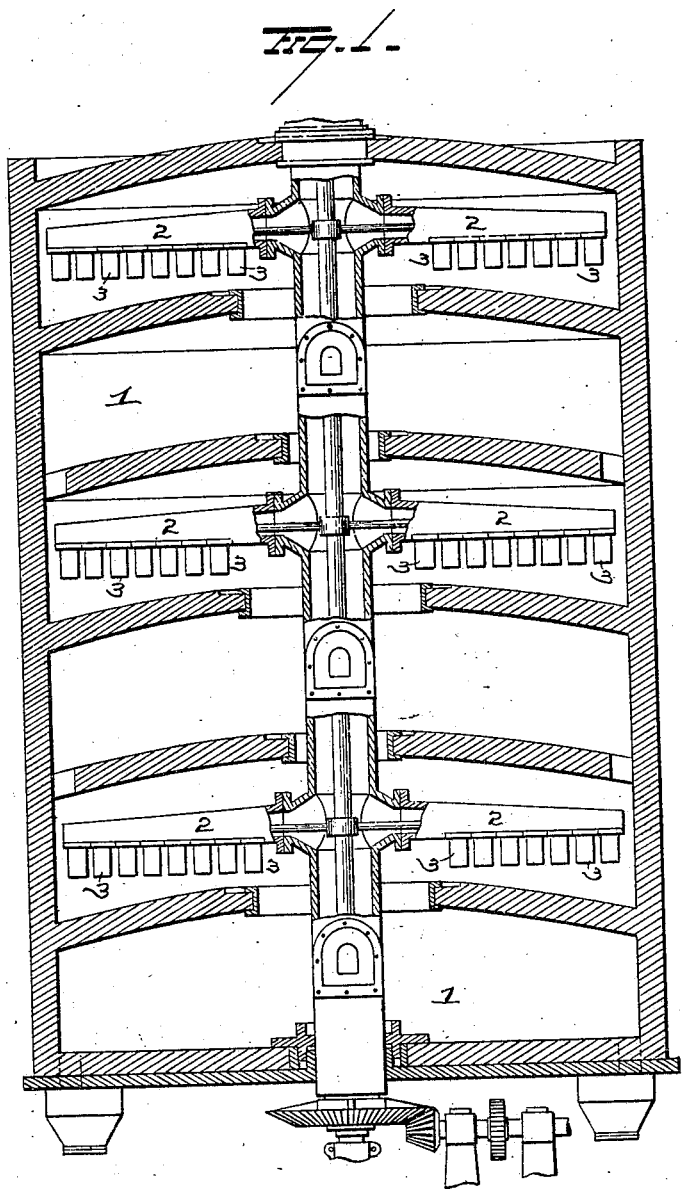
Figure 2:
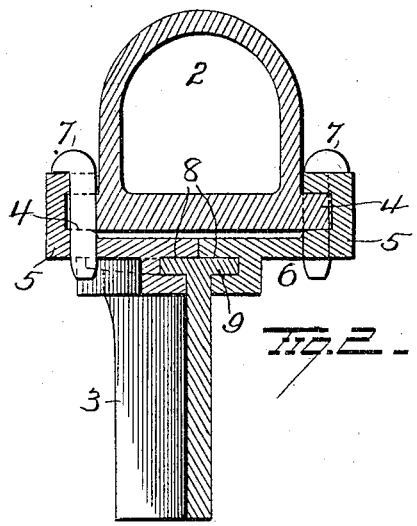
Figure 3:
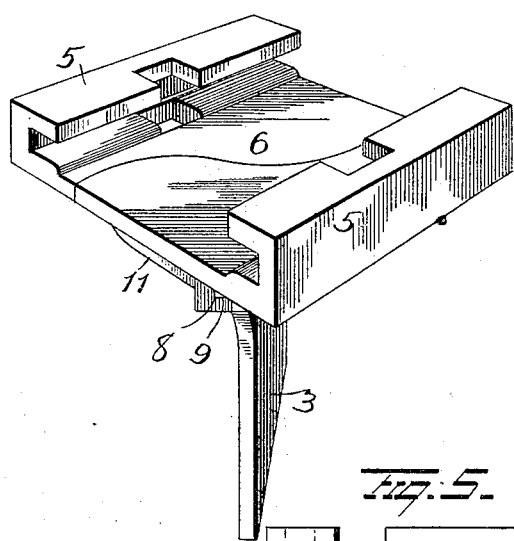
Figure 4:
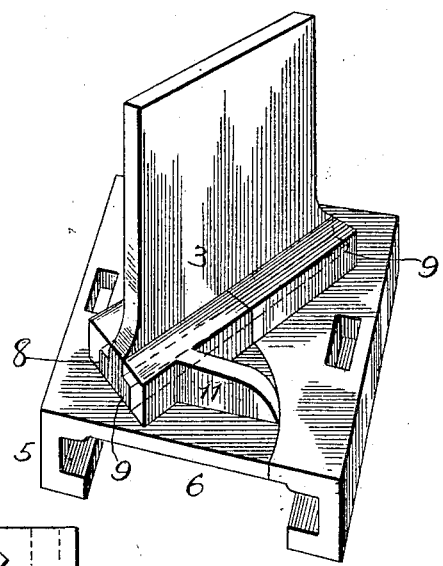
Figure 5:
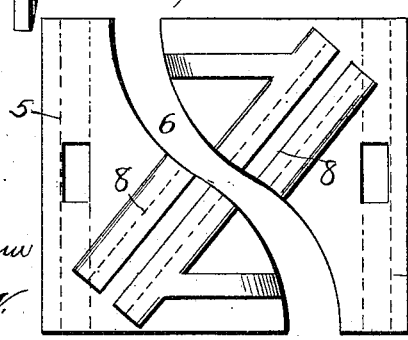

In the accompanying drawings, Figure 1 is a view in vertical section of a McDougall furnace illustrating my improvements; and Figs. 2, 3, 4, and 5 are enlarged detail views of my improved rake and its split-frame attachment.

1 represents a McDougall furnace, and 2 represents the arms of a rotary frame carrying my improved rakes or blades 3. The arms 2 are made with side flanges or ribs 4 to receive the grooved or angle side aprons 5 of frames 6 and support the latter, and pins 7 are located in alined openings in aprons 5 and flanges 4 to prevent any longitudinal movement of the frames 6 on arms 2, said pins 7 being preferably made with heads at their upper ends to limit their downward movement. Each frame 6 is made in two half-sections having registering configuration or juncture which may be in the form of a diagonal compound curve, as illustrated, or might be otherwise shaped, and each section is made with a dovetailed open-end housing 8, which aline when together to receive a tenon 9 on the upper end of the blade or rake 3. The tenon 9 is long enough to fill both housings 8 and cross the point of juncture of the frame-sections, thereby holding them together on the arm, and the interior of the housings is on a bevel to receive the similarly beveled or inclined tenon 9 and permit the parts to tightly wedge together. The housings are preferably strengthened by webs 11, as shown, and may be located at any angle to suit conditions, some frames having their housings located at an angle opposite to the others, so that the rakes of the different arms may move the material to the center of the furnace-chambers and others to the outside, as is the case with furnaces of this type. By this arrangement of parts it will be seen that any blade, regardless of its position on the arm, can be removed without disturbing the other blades, and such parts of the frame or blade as may be damaged can be thrown away and new parts used to replace them, and the frame and blade can be replaced on the arm at any point thereof without moving any other frame or blade.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a device of the character described, the combination of a split frame and a rake or blade attached to alining faces of the parts of said split frame and operating to maintain the attachment of said frame to a rake-arm and prevent movement of the parts of said split frame relatively to each other.

2. In a device of the character described, the combination of a split frame constructed to be inserted on a rake-arm, and a rake or blade having a tenon to secure the frame-sections together on the arm and the rake or blade thereto.

3. In a device of the character described, the combination of a split frame having angle-aprons at its sides to fit over flanges of a rake-arm, dovetailed alined housings on the frame, a rake or blade, and a tenon on the rake or blade to enter the alined housings, secure the frame-sections together on the arm and the rake thereto.

4. In a device of the character described, the combination of a split frame having angle-aprons at its sides to fit over flanges of a rake-arm, dovetailed alined housings on the frame-sections, a rake or blade, and a tenon on one end thereof to enter the alined housings, and said tenon and the housings made inclined or wedge-shape to wedge the parts together.

5. In a device of the character described, the combination with a rake-arm having side flanges, of split frames having angle-aprons at their edges to receive the side flanges of the arm, pins in alined openings or notches in the frame-flanges and aprons, alined dovetailed housings on the frame-sections, a rake or blade, and a tenon thereon to fit into the alined housings.

6. In a device of the character described, the combination of two separable members having diagonal abutting edges and each member having means to engage a rake-arm, of a rake or blade having a head disposed at right angles to the dividing-line of the two members and extending across said dividing-line, and means for locking the parts together.

7. In a device of the character described, the combination with a rake-arm, of two separable members embracing said arm, a rake or scraper locking said members together on the rake-arm, and means for preventing longitudinal movement of said members and the rake or scraper relative to the rake-arm.

In testimony whereof I have signed this specification in the presence of two subscribing witnesses.

GEORGE S. CROUSE.

Witnesses:
S. RAY SWEENEY,
EWALD HAUSEN.